April 7, 1925. 1,532,641
B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923 13 Sheets-Sheet 1

April 7, 1925.                                                              1,532,641
                       B. R. WILLIAMSON
     ORGANIZED APPARATUS FOR ASSEMBLING, SCORING, BREAKING, AND
         UNITING MEMBERS TO FORM A KNOCKDOWN BASKET
                  Filed Sept. 11, 1923        13 Sheets-Sheet 2

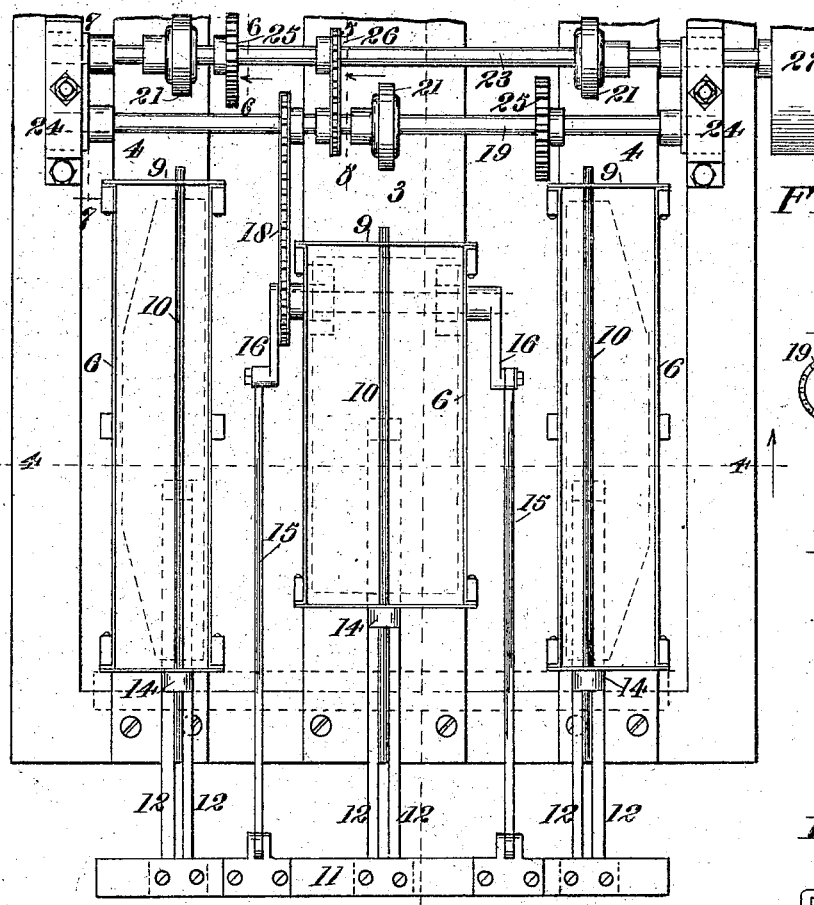
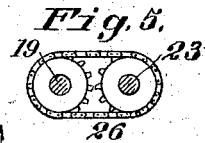
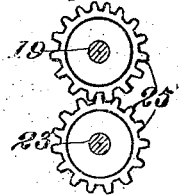
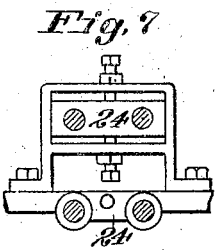
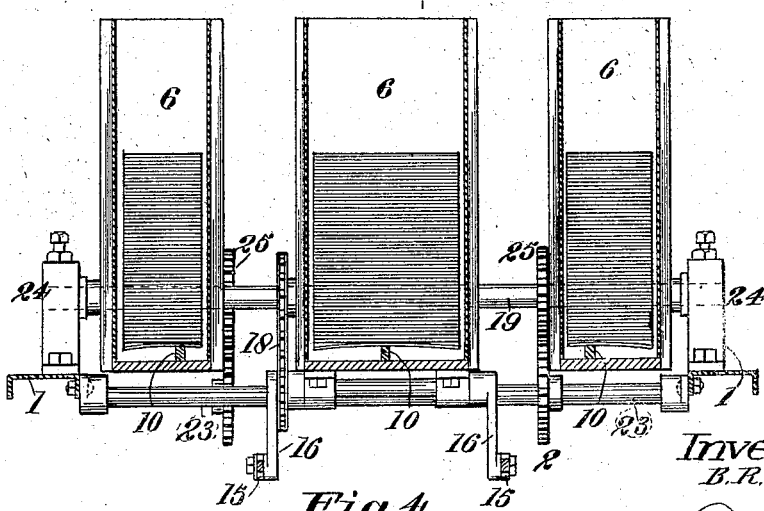

April 7, 1925.  
B. R. WILLIAMSON  
ORGANIZED APPARATUS FOR ASSEMBLING, SCORING, BREAKING, AND UNITING MEMBERS TO FORM A KNOCKDOWN BASKET  
Filed Sept. 11, 1923 13 Sheets-Sheet 4

1,532,641

Inventor,
B. R. Williamson.
By Attorneys.

April 7, 1925. 1,532,641
B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923 13 Sheets-Sheet 5

April 7, 1925. 1,532,641
B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923 13 Sheets-Sheet 6
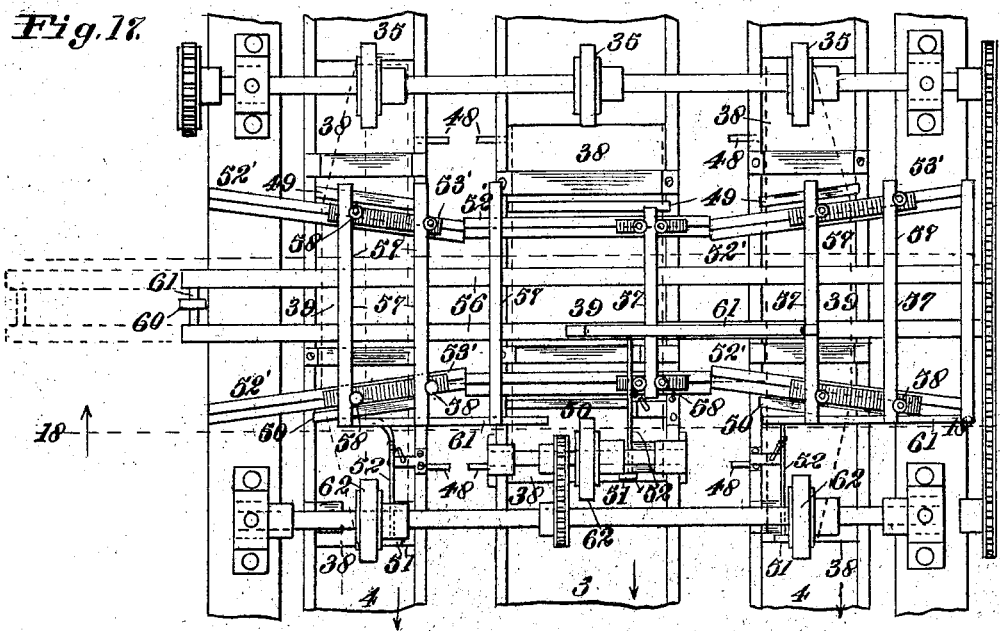
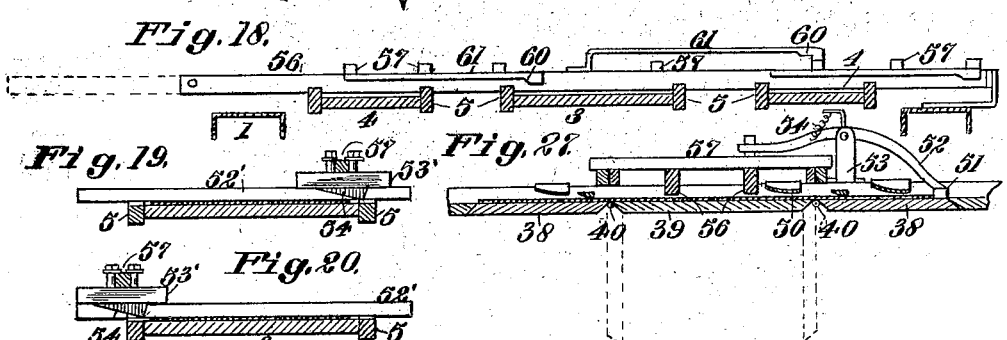
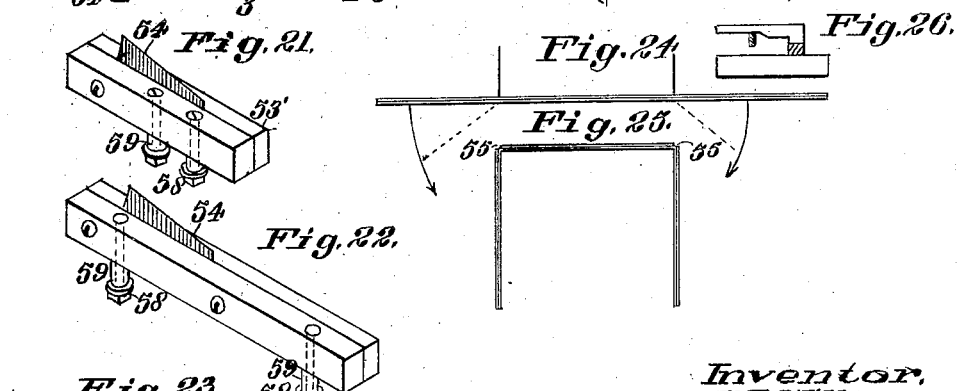
Inventor,
B. R. Williamson.
By
Attorneys.

April 7, 1925.
1,532,641

B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923    13 Sheets-Sheet 7

Inventor,
B. R. Williamson,
By
attorneys.

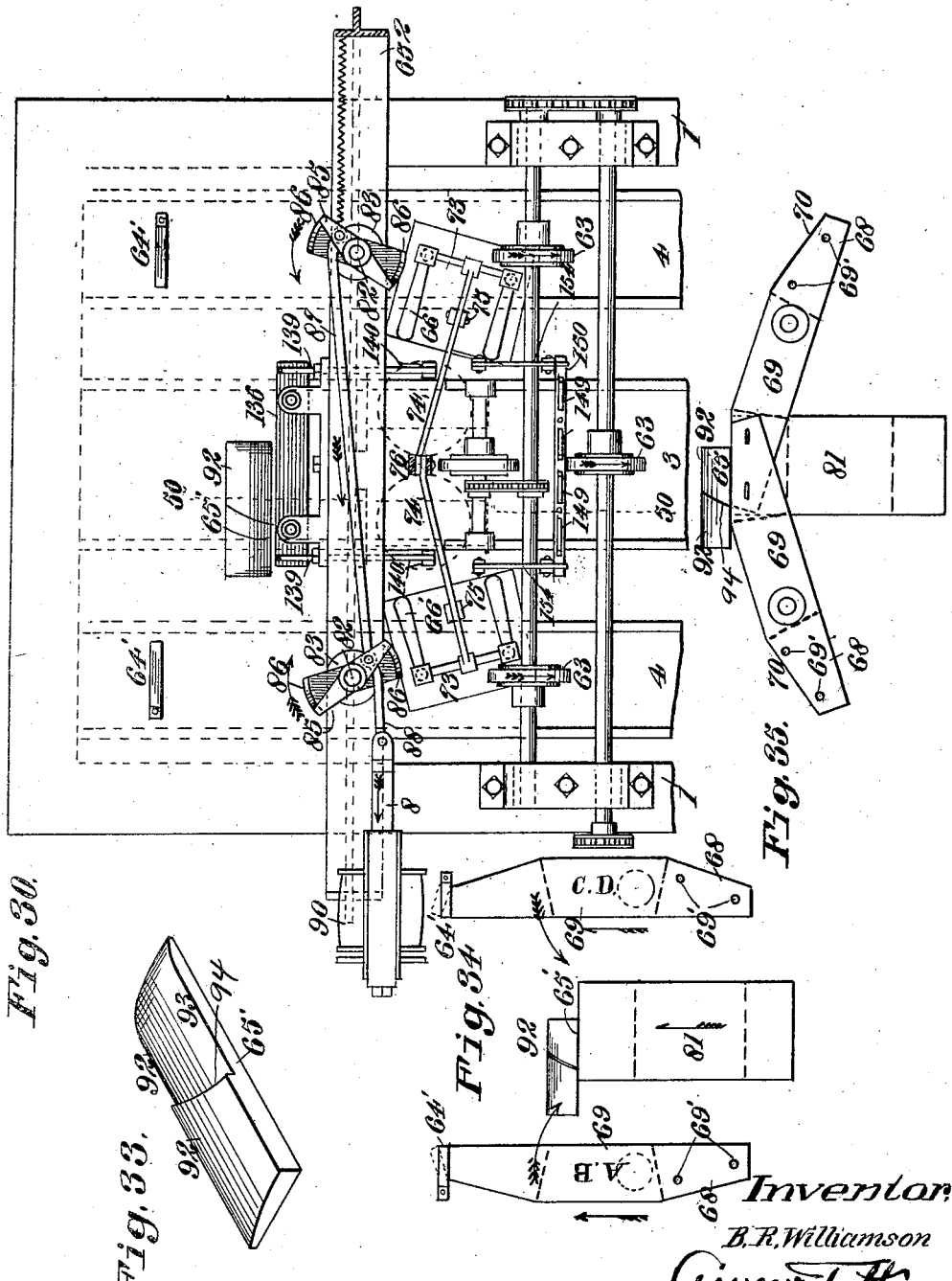

April 7, 1925.
B. R. WILLIAMSON
1,532,641
ORGANIZED APPARATUS FOR ASSEMBLING, SCORING, BREAKING, AND
UNITING MEMBERS TO FORM A KNOCKDOWN BASKET
Filed Sept. 11, 1923    13 Sheets-Sheet 9
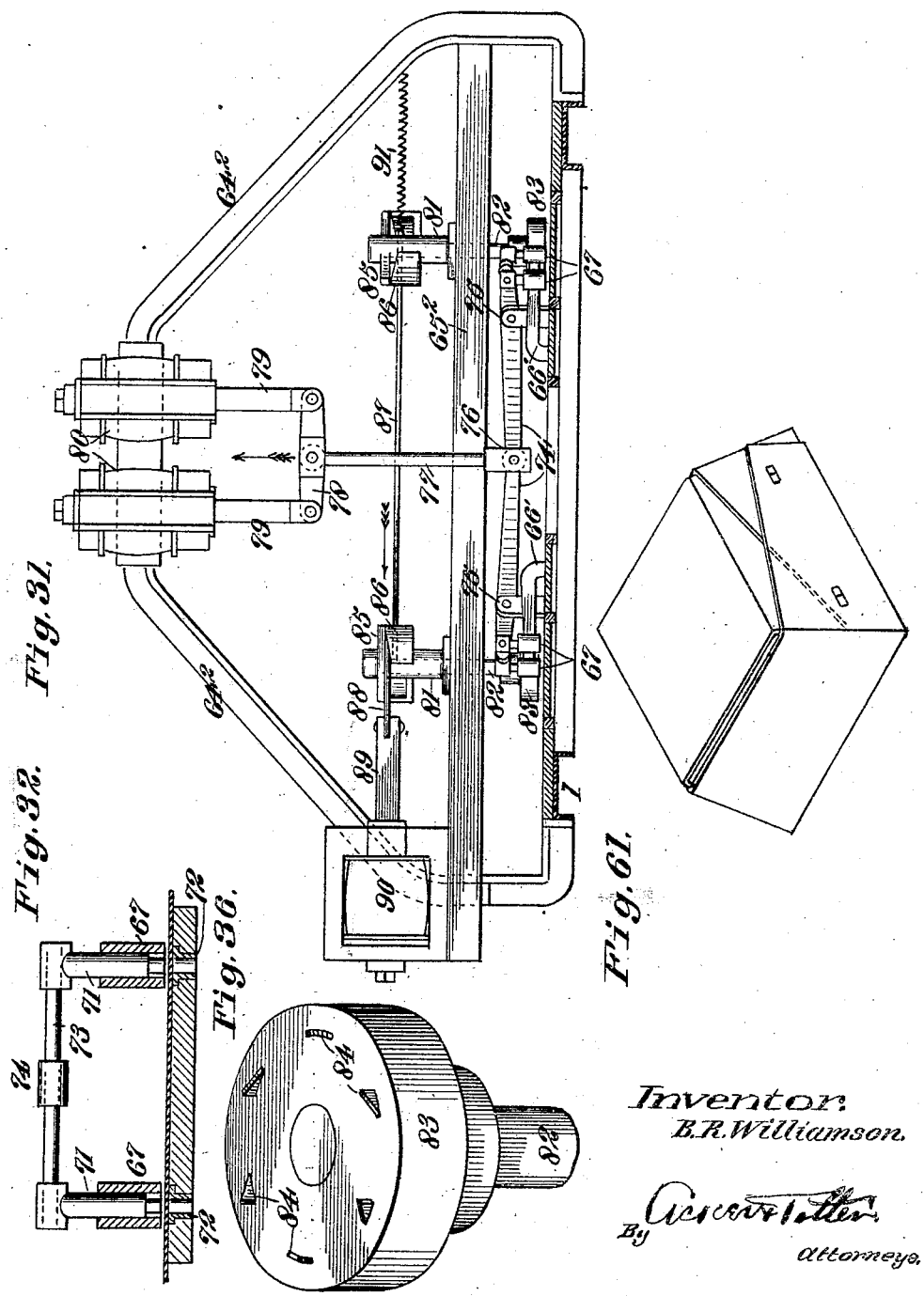
Inventor:
B.R.Williamson.
By Attorneys.

April 7, 1925. 1,532,641
B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923 13 Sheets-Sheet 10
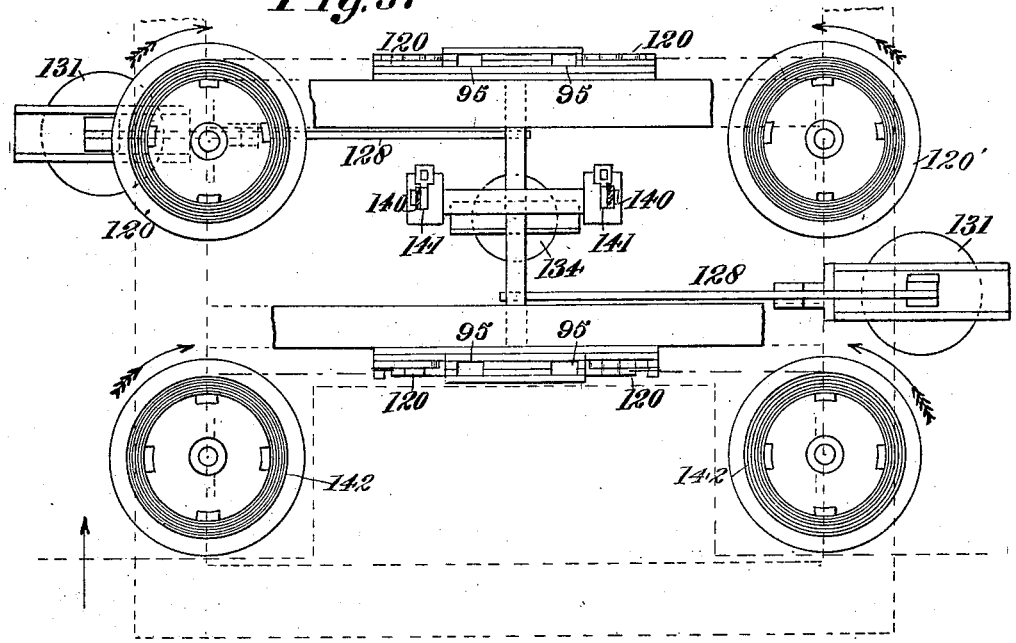
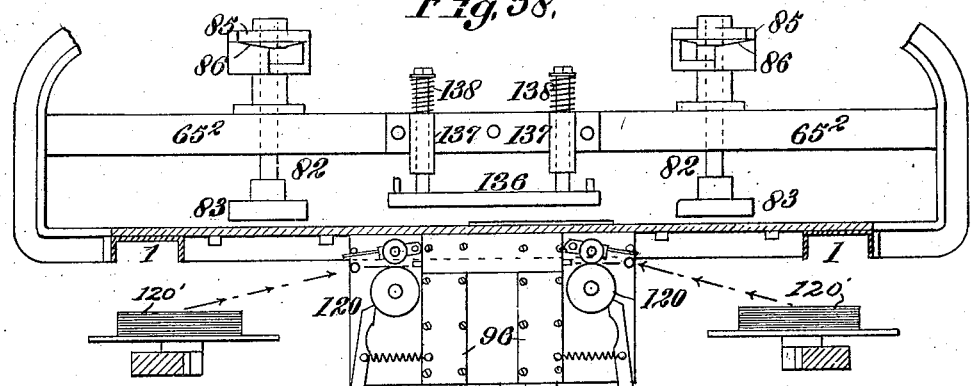
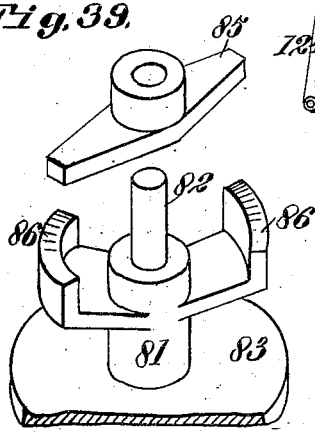
Inventor,
B. R. Williamson.
By
Attorneys.

April 7, 1925.  1,532,641
B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923   13 Sheets-Sheet 11
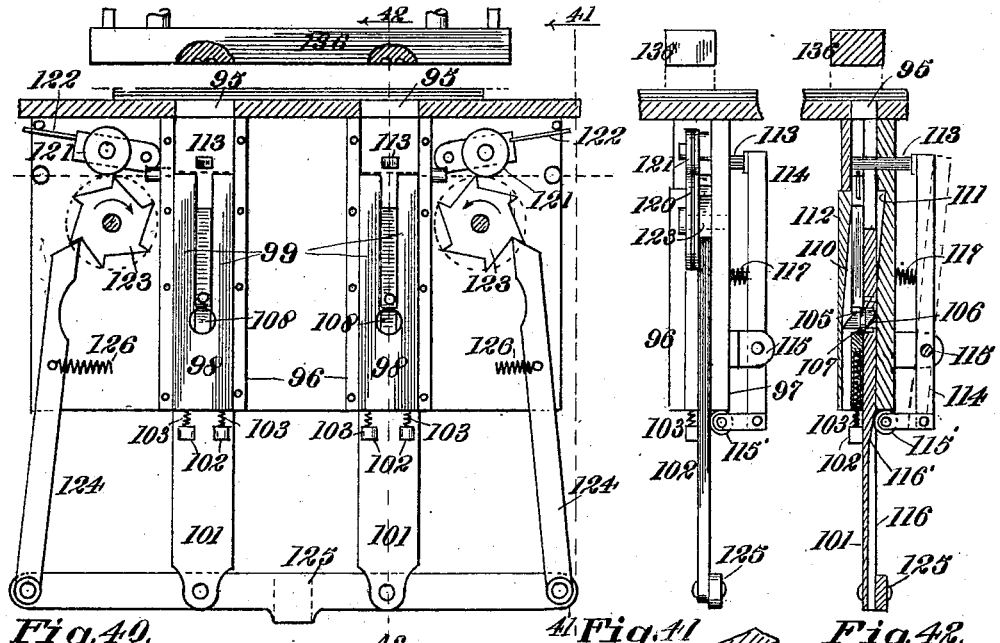
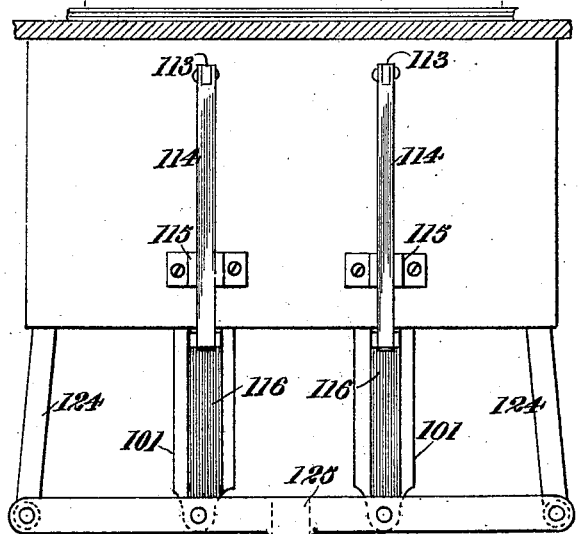
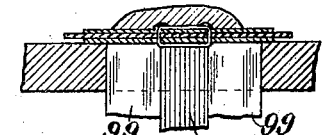
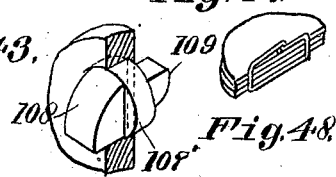
Inventor.
B. R. Williamson April 7, 1925.                                              1,532,641
B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923        13 Sheets-Sheet 12
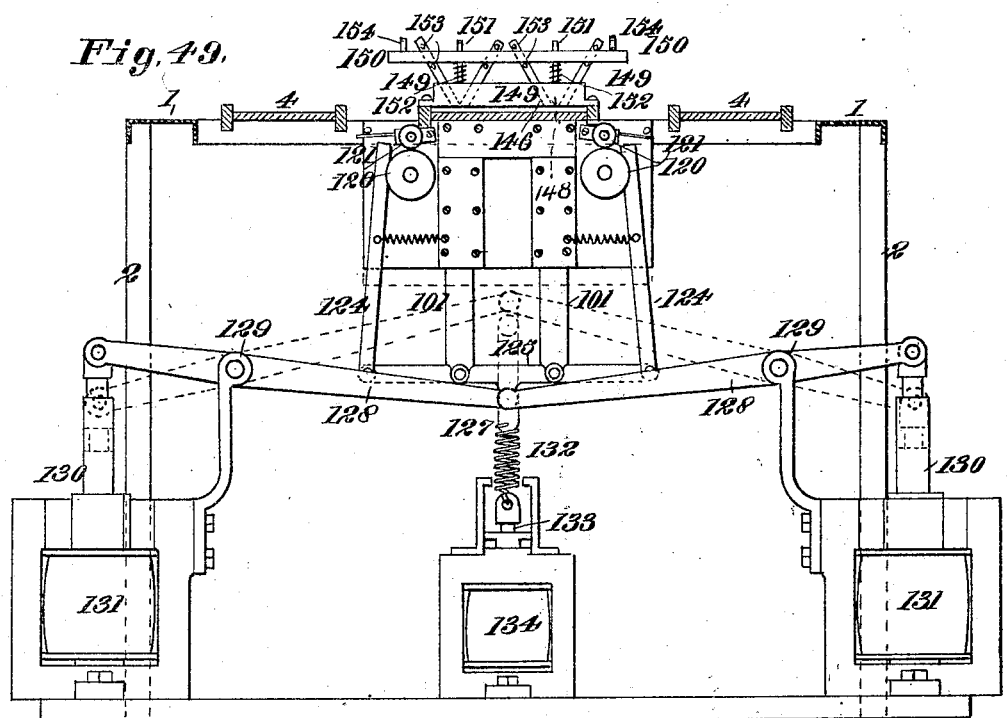
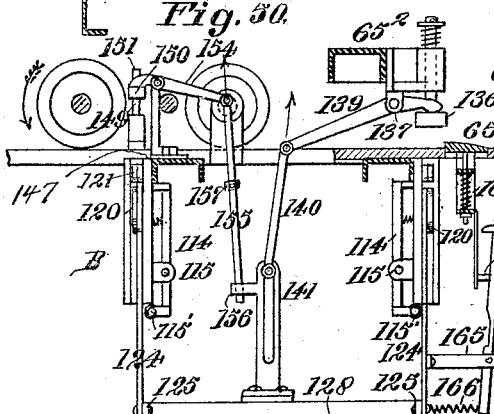
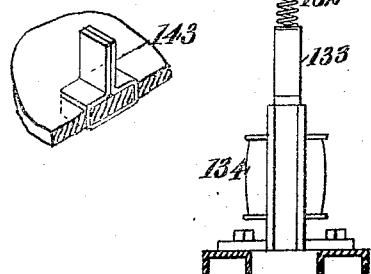
Inventor
B. R. Williamson
By
Attorneys April 7, 1925. 1,532,641
B. R. WILLIAMSON
ORGANIZED APPARATUS FOR ASSEMBLING, SCORING, BREAKING, AND
UNITING MEMBERS TO FORM A KNOCKDOWN BASKET
Filed Sept. 11, 1923    13 Sheets-Sheet 13
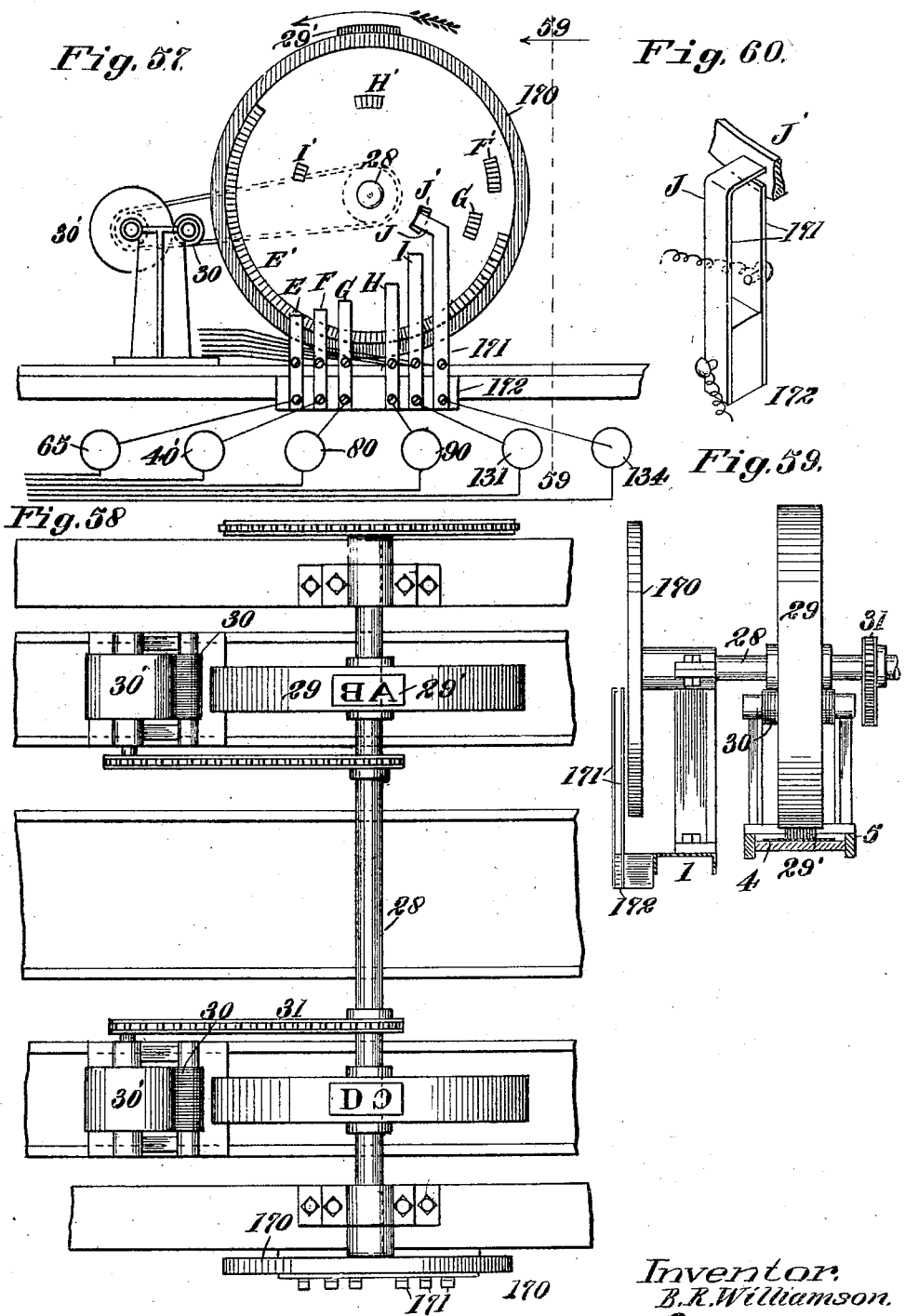
Inventor:
B. R. Williamson.

Patented Apr. 7, 1925.

1,532,641

UNITED STATES PATENT OFFICE.

BARTLETT R. WILLIAMSON, OF SAN FRANCISCO, CALIFORNIA, ASSIGNOR TO JOHN A. WILLIAMSON, OF SAN FRANCISCO, CALIFORNIA.

ORGANIZED APPARATUS FOR ASSEMBLING, SCORING, BREAKING, AND UNITING MEMBERS TO FORM A KNOCKDOWN BASKET.

Application filed September 11, 1923. Serial No. 662,078.

*To all whom it may concern:*

Be it known that I, BARTLETT R. WILLIAMSON, a citizen of the United States, residing at the city and county of San Francisco and State of California, have invented certain new and useful Improvements in Organized Apparatus for Assembling, Scoring, Breaking, and Uniting Members to Form a Knockdown Basket, of which the following is a specification.

My invention relates to an organized machine or apparatus for assembling suitable sheets of material in flat formation enabling their folding into a basket of the type set forth in my co-pending application for Letters Patent of the United States Serial Number 535,156, filed February 9th, 1922.

Among the objects of this invention are:—The provision of automatic means for delivering thin sheets of material to a scoring mechanism for the scoring thereof and the breaking of the material on the scored lines to facilitate its subsequent folding into basket formation. To provide automatic means for arranging sheets in co-operative relation, and for securing the same one to the other enabling their shipment as assembled units in flat formation. To provide automatic means for aperturing portions of the strips and for forming and positioning therein means adapted to be used as a retainer when the blanks are folded into basket formation. Another object is to provide a means for marking or indicating on the sheets any desired information such as trade-mark or brand, and to accomplish this while the sheets are in process of forming the basket blank.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Fig. 2 is a view in top plan of the invention illustrated in Fig. 1.

Fig. 3 is a view in detail plan of the sheet holding magazines and reciprocating material feeds associated therewith.

Fig. 4 is a transverse sectional view taken on line 4—4 of Fig. 3.

Fig. 5 is a view in detail of the drive connection taken on line 5—5 of Fig. 3.

Fig. 6 is a view in detail of the gear connection taken on line 6—6 of Fig. 3.

Fig. 7 is a detail view of one of the bearings taken on line 7—7 of Fig. 3.

Fig. 17 is a view in detail top plan of the sheet scoring mechanism illustrating the sheet breaker mechanism.

Fig. 18 is a sectional view taken on line 18—18 of Fig. 17.

Fig. 19 is a view in detail of the basket bottom forming sheet and the scoring knife therefor.

Fig. 20 is a view similar to Fig. 19 illustrating the knife after being drawn across the sheet.

Fig. 21 is an inverted perspective view of the scoring knife illustrated in Figs. 19 and 20.

Fig. 22 is an inverted perspective view of the scoring knife operating on the basket forming side sheets.

Fig. 23 is a view in plan of one of the side sheets after being scored.

Fig. 24 is a diagrammatic view of one of the basket forming sheets illustrating the lines on which the same is scored and broken and the direction of the break.

Fig. 25 is an end view of one of the sheets scored and broken.

Fig. 26 is a release for the stop mechanism.

Fig. 27 is a detail sectional view of the strap members illustrating the breaker strips and one of the sheet stops.

Fig. 30 is a view in detail plan of the mechanism for swinging the side forming sheets into overlapping relation over the bottom forming sheet, and the sheet perforating mechanism.

Fig. 31 is a detail view in side elevation of the sheet perforating mechanism and the sheet swinging mechanism.

Fig. 32 is a view in detail of the sheet perforating mechanism.

Fig. 33 is a view in detail of the guide for controlling the overlapping relation of the sheet ends when the same are swung into co-operative relation.

Fig. 34 is a diagrammatic view of the sheets in their relative positions prior to being swung in overlapping relation.

Fig. 35 is a view illustrating the sheets after being swung into overlapping relation.

Fig. 36 is a bottom plan view of one of the sheet swinging heads.

Fig. 37 is a fragmentary view in detail plan of the staple forming mechanism.

Fig. 38 is a view in elevation of the staple forming mechanism.

Fig. 39 is an isometric view of one of the sheet swinging heads illustrating one of its operating elements.

Fig. 40 is a view in detail front elevation of the staple forming mechanism.

Fig. 41 is an end view taken on line 41—41 of Fig. 40.

Fig. 42 is a vertical sectional view taken on line 42—42 of Fig. 40.

Fig. 43 is a view in rear elevation of the staple forming mechanism.

Fig. 44 is a view in detail perspective of the stationary staple forming dies, and the wire cut off.

Fig. 45 is a view in detail perspective of the wire after bending into staple formation by the movable staple forming die passing between the stationary staple forming dies.

Fig. 46 is a detail sectional view of the staple clinching anvils with the staple clinched through the material thereby.

Fig. 47 is a view in detail perspective of a staple retaining the sheets in superimposed relation.

Fig. 48 is a view in detail broken perspective of the interlocking device.

Fig. 49 is a transverse sectional view of the apparatus illustrating the mechanism for forming the final retaining clip for holding the interfolded basket sections in assembled position.

Fig. 50 is a sectional view taken on line 50—50 of Fig. 30.

Fig. 51 is a sectional view of the stop in raised position.

Fig. 52 is a similar section to that illustrated in Fig. 51, with the stop in lowered position.

Fig. 53 is a view in detailed side elevation of the stop.

Fig. 54 is a view in detail illustrating the operation of the clip forming mechanism.

Fig. 55 is a view similar to Fig. 54, illustrating the parts forming a clip in closing a portion of the bracket, so that the clip will be retained therein.

Fig. 56 is a view in elevation of the finished clip.

Fig. 57 is a view in detailed side elevation illustrating the timing contact device for controlling the operation of the various magnets.

Fig. 58 is a view in plan of the shaft mounting the disk in Fig. 51 and illustrating the blank stencilling means thereon.

Fig. 59 is a sectional view taken on line 59 of Fig. 57.

Fig. 60 is a detailed perspective view of one of the contact fingers.

Fig. 61 is a view in perspective of one of the completed baskets.

The sequence of operations in carrying out this invention may be briefly described as follows:—

Two side forming sheets and a bottom forming sheet are delivered from magazines and are propelled along guideways in parallel relation. They are first marked or branded and are then delivered to mechanism which scores the same transversely, the scores on the bottom forming sheet being in parallel relation and the scores on the side forming sheets being in angular relation. After being scored, the sheets are broken on the score lines and are then conveyed along the guideways to a point where the forward ends of the side forming sheets are punctured or perforated for the reception of a retaining fastener. The sheets are then conveyed to a point where the side forming sheets are disposed angularly with their rear ends in superimposed relation over the rear end of the bottom forming sheet. The overlapping ends of the sheets are then united by a fastening means passed therethrough which retains the side forming sheets in angular relation one projecting from either edge of the bottom forming sheet, after which time the united sheets, which form a unit from which a basket may be folded, are provided in the forward end of the bottom forming sheet with a digitally operatable fastening means and are then ejected from the apparatus.

For carrying out these various steps in the formation of this box or basket forming blank, an embodiment of an apparatus has been illustrated, and the operation of the various units will be hereinafter described in sequence in their order of operation as the sheets are acted on by the respective mechanism.

Figure 14:
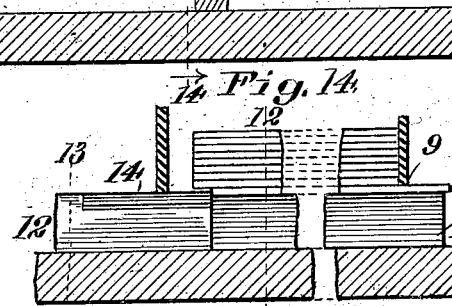
Fig. 14 is a sectional view taken on line 14—14 of Fig. 12.
Figure 15:
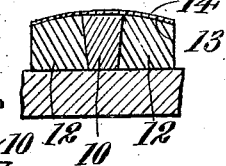
Fig. 15 is a sectional view taken on line 15—15 of Fig. 11.
Figure 16:
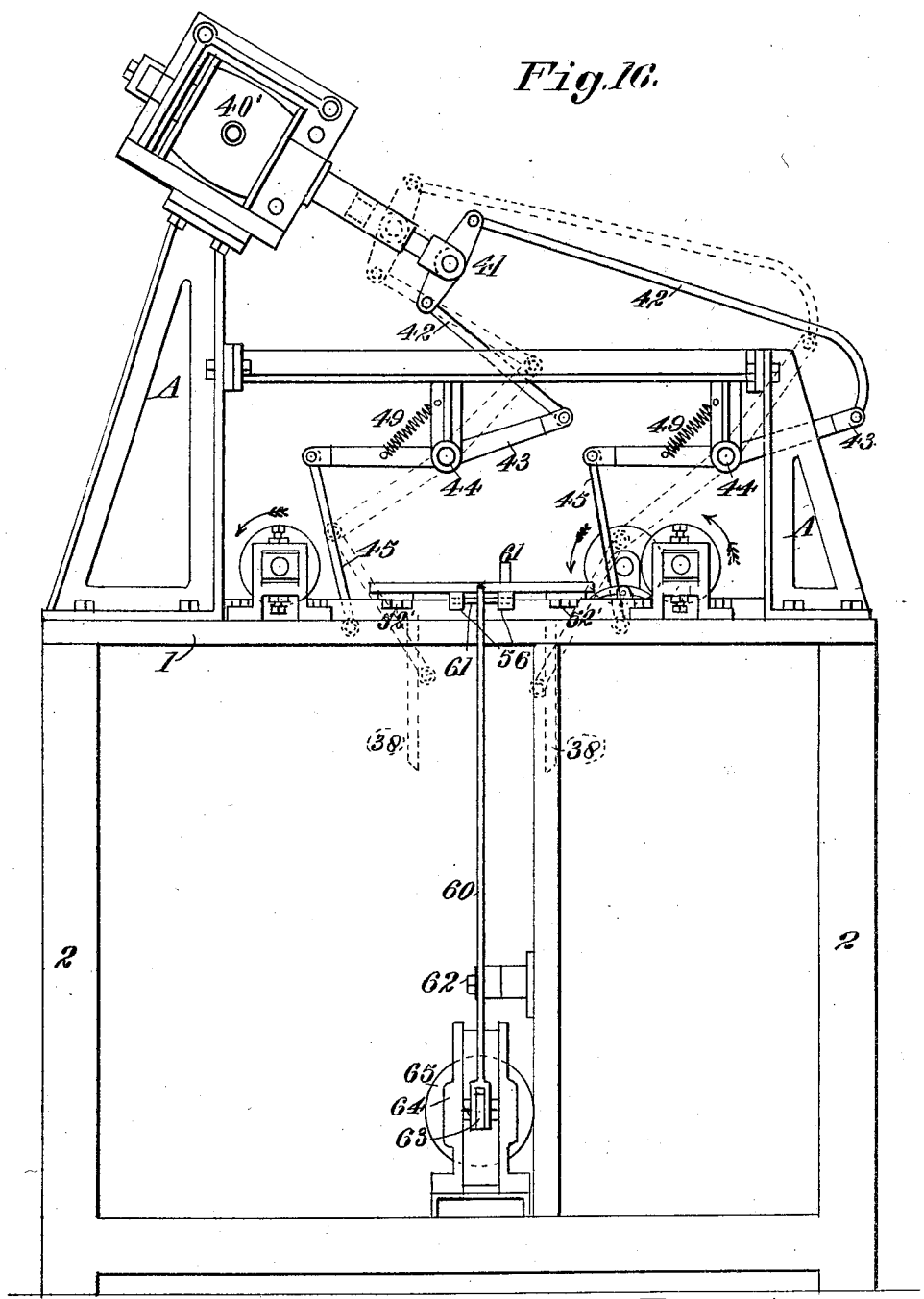
Fig. 16 is a view in detail side elevation of the breaker mechanism.
Figure 28:
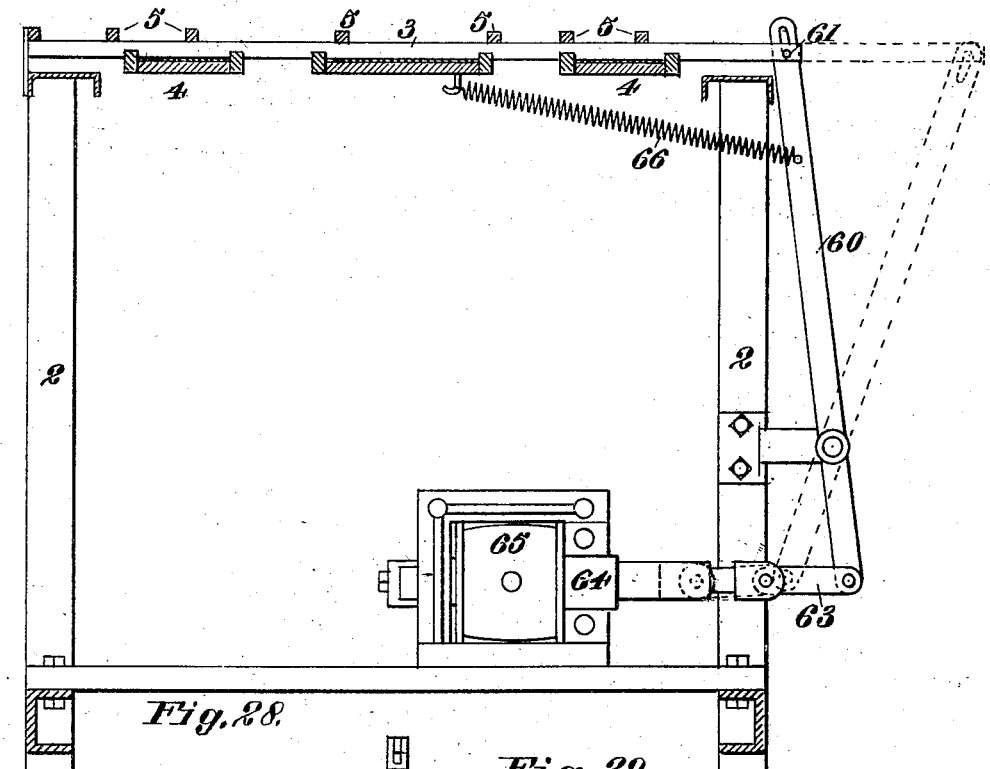
Fig. 28 is a view in detail of the reciprocating member operating the scoring knives and its associated operating mechanism.
Figure 29:
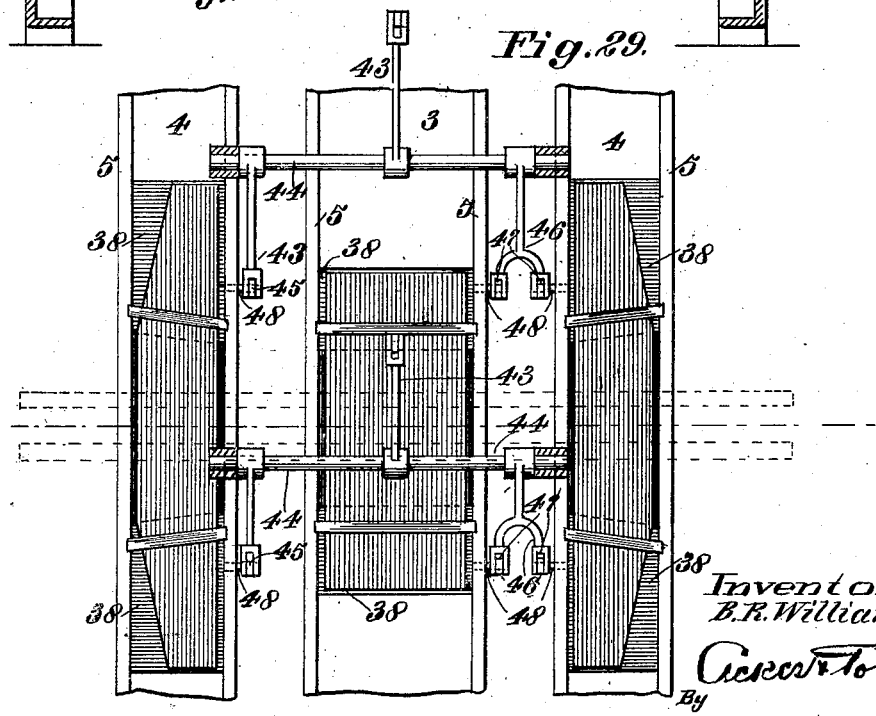
Fig. 29 is a view in detail plan of the sheet runways illustrating the breaker mechanism.

In the drawings, wherein like characters of reference designate corresponding parts, 1 indicates a suitable elongated rectangular frame preferably supported at the desired height on legs 2. Disposed longitudinally of the open top of the frame and arranged in parallel spaced relation are the guideways 3 and 4, each provided for a portion of its length with upstanding side rails 5. The guideways 4 are preferably two in number, one disposed on each side of the guideway 3, and the guideways 4 receive the receptacle side forming sheets, and the guideway 3 receives the receptacle bottom forming sheets. Positioned one over each guideway 3 and 4 at the feed end A of the apparatus are the sheet holding magazines 6, Figs. 3, 4 and 8, and said magazines are open at the lower edges of their front and rear walls 7 and 8 as at 9, Figs. 8 and 14. Disposed longitudinally of the guideways 3 and 4 at the bottom of each magazine 6, is a stack supporting rod 10 of relatively narrow width, and one end of the members 10 projects beyond the sheet discharge opening 9 of its respective magazine.

To engage the lowermost sheet of the respective stacks and to remove and discharge the same from the feed opening 9 thereof, I employ a reciprocating mechanism in the form of a frame. The frame consists of a head-piece 11 mounting a plurality of pairs of sheet removing fingers 12, one pair of fingers being associated with the sheet supporting member 10 of each magazine, as in Figs. 3, 4, 14 and 15 of the drawings. The fingers of each pair operate one on each side of its associated member 10, and said fingers at their free forward ends are crowned as at 13 and are secured together by a tie-plate 14, which projects a distance equal to its thickness above the upper surface of its associated member 10. Reciprocating motion is imparted to the frame 11 through links 15 which connect with cranks 16 on the ends of a shaft 17 driven through a suitable connection 18 off of a shaft 19.

It will be observed from the drawings that the side forming sheets are of a length greater than the bottom forming sheet, and that the pairs of fingers 12 are of a length to simultaneously remove the lowermost sheet from each magazine, and to advance the same in a position with the free ends of the side forming sheets projected beyond the end of the bottom forming sheet as illustrated in dotted lines, Fig. 3.

Figure 12:
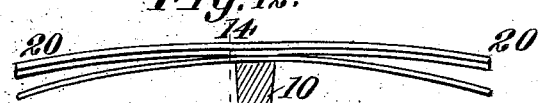
Fig. 12 is a transverse sectional view through the base of one of the magazines taken on line 12—12 of Fig. 14.
Figure 13:
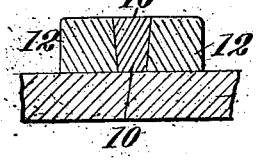
Fig. 13 is a sectional view taken on line 13—13 of Fig. 14.

The single supporting rod disposed in the base of each magazine permits the sides of the respective sheets owing to being unsupported, to drop or droop as at 20, Fig. 12 of the drawings, enabling the same to be readily engaged by the connecting plate 14 and easily removed from the bottom of the stack. Thus the lowermost sheet in each magazine prior to being discharged therefrom is separated at its edges from the sheet or blank immediately above it and is thus easily removed from the bottom of the stack, on its edge being engaged by the edge of the tie plate 14, Fig. 14, when the frame is in its retracted position withdrawing the tie plate from beneath the stack.

Figure 8:
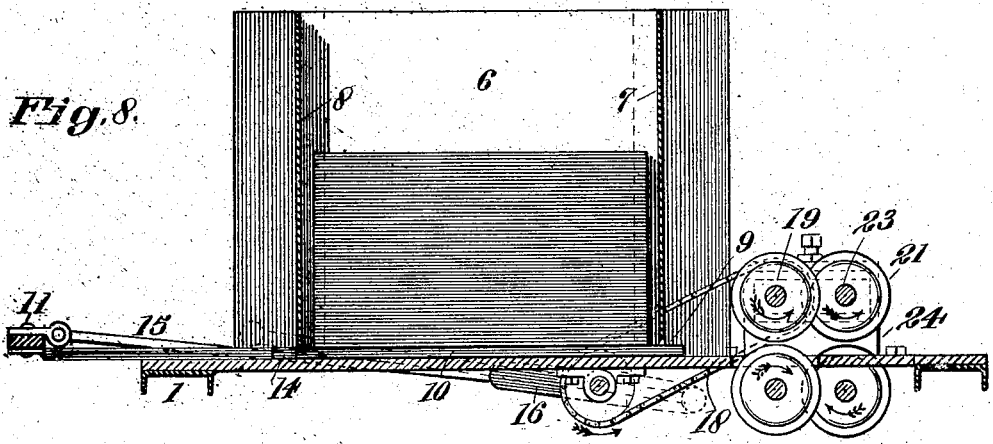
Fig. 8 is a longitudinal detail sectional view of one of the magazines illustrating the feed rolls associated therewith.
Figure 9:
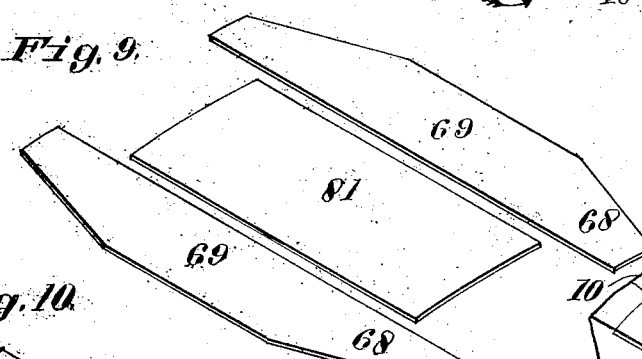
Fig. 9 is a view in elevation of the sheets in their position as held within the respective magazines.
Figure 11:
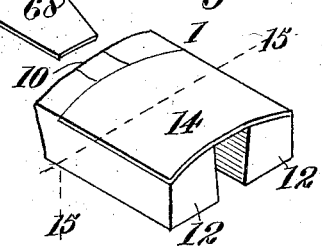
Fig. 11 is a fragmentary perspective view of the sheet feeding means in the base of each magazine.
Figure 10:
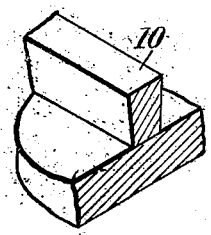
Fig. 10 is a fragmentary perspective view of the sheet supporting means in the base of each magazine.

As the sheets or blanks are simultaneously removed from the respective magazines through the openings 9, they are engaged by and caused to pass between pairs of feed rolls 21, Fig. 8. The feed rolls are carried on the upper and lower pairs of shafts 19 and 23 rotatable in bearings 24 at their ends, and the co-operating shafts of adjacent pairs are intergeared at 25 to cause the shafts of the respective pairs to rotate in the same direction. One of the shafts 19 is driven off of a general connection 26 from the shaft 23. The upper shaft 23 of the pair is a power shaft carrying on its end a power wheel 27.

During the advancement of the sheets or blanks in battery formation between the feed rolls and immediately after their removal from the magazines any desired data such as trade-mark, brand, or advertisement may be printed on the surface thereof by the following mechanism:—

Disposed transversely above the frame A and rotatable in bearings is a control shaft 28, Figs. 57 and 58, mounting printing rollers 29 one over the path of travel of each side forming blank. The rolls mount printing characters 29' adapted to be inked through contact with ink applying rolls 30, engaged by ink feed rolls 30' driven through flexible connections 31 from the shaft 28. The contacting of the printing characters 29' with the surface of the side wall forming blanks assists in advancing the same along the guideways 4, and the bottom forming strip or blank is assisted at a corresponding point by a feed roller 32 driven from a shaft 33 through a connection 34. The shaft 33 extends transversely over the guideways and is provided with a plurality of feed rolls 35 one associated with each guideway for engaging the strips or blanks and propelling the same from the printing mechanism to the mechanism for scoring and breaking the same. A chain 36 connects the shaft 33 with the upper shaft 19 and said shaft 33 is in turn operated through a flexible connection 37 from the shaft 28.

The feed rolls 35 deliver the printed strips or blanks to the mechanism for scoring the same transversely, and for breaking the blanks on their scores to facilitate the ready folding of the same into baskets at a subsequent time, this mechanism being particularly illustrated in Fig. 1 and Figs. 16 to 29 inclusive. At a point immediately beyond the feed rolls 35 each guideway is provided with a pair of downwardly swinging trap doors 38 disposed one on either side of stationary central section 39. Hinges 40 permit the downward swinging movement of the doors 38 and the same are cut to swing on the angle the blank is to be scored and broken. In the present illustration, the trap doors 38 of the center guideway 3 swing on a line transversely of the guideway, while the trap doors of the side guideways 4 swing on an angle outwardly from the inner line of the guideway. To quickly operate the trap doors, I prefer to employ the electromagnet 40' carried by a frame disposed above the frame A, and the core thereof mounts a cross head 41 connected through a pair of links 42 with one end of the respective levers 43. A pair of oscillating shafts 44 extends transversely of the center guideway, and the same connect one with each lever 43 through the links 45. Near the opposite ends the shafts 44 carry arms 46 which connect at their ends through links 47 with pins 48 extending laterally from the trap doors 38 adjacent their free ends. Springs 49 associated with the levers 43 assist in returning the trap doors to normal position on the de-energizing of the magnet 40'. To cause the ends of the sheets to travel with the trap doors 38 in their downward and return movement, the sheets or blanks in their advancement by the rolls 35 pass beneath the bars 49—50, one positioned in slight transverse relation over the upper surface of each trap door 38 adjacent to its mounting hinge 40.

Prior to the operation of the trap doors 38, the sheets or blanks are arrested in their movement longitudinally of the runways, and are transversely scored on the line of pivot or hinge 40 of the trap doors 38. The means for temporarily arresting the movement of the sheets or blankets is constructed as follows:—

A stop arm 51 is disposed transversely of the free end of the trap door of each runway located farthest from the feed roll 35, and each arm 51 is carried by the lever 52— Figs. 17 and 27, the levers being each carried by a bracket 53 extending upwardly from the runway side wall. A spring 54 operates to normally depress the end of the lever carrying the stop 51.

The mechanism for scoring the blanks is constructed and operates in the following manner:—

Disposed transversely of the guideways 3 and 4 and supported on the rails 5 at points overlying the hinge connections between trap doors 38 and the stationary portion 39 are the parallel pairs of spaced guides 52'. On the upper surface of each pair of guides 52' operate the supporting backs 53' each mounting a pointed scoring knife 54 depending therefrom, and which knives project through and operate in the space between the pairs of guides 52', the knives being adapted, on their movement transversely of the guideways, to score the sheets or blanks beneath the same inwardly for a slight depth from their upper surface as at 55 Fig. 25 of the drawings.

To operate the knives in their respective guides, a frame is provided consisting of the main members 56 and the cross members 57, the ends of which co-operate with engaging studs 58 extending upwardly from the brackets 53'. The backs carrying the knives for scoring the basket side wall blanks are relatively long, Fig. 17, and carry studs 58 located one adjacent to each end thereof, one stud engaging the outer side of the respective cross members associated with that particular guideway. This facilitates the movement of these particular knives angularly to and from the main frame members 56 and insures the free sliding movement of the antifriction spools 59 on the studs 58 longitudinally of the cross members 57.

With the center runway there is associated but one cross member 57 and which is engaged at opposite sides by the studs 58 extending upwardly from the co-operating knife backs 53'. To operate the frame there is provided a lever 60 attached at its upper end through a flexible connection 61 with one end of the frame members 56. The lever 60 is fulcrumed as at 62, and at its lower end it connects through a link 63 with the core 64 by an electromagnet 65 intermittently energized in the hereinafter described manner to move the knives in one direction to score the blanks or sheets. A spring 66 operates the knives in a reverse direction.

After the knives have completed their scoring stroke and prior to returning to normal position, and after the trap doors have been operated to break the blanks on their scored lines, the stop arms 51 are raised by the action of cams 60 on cam tracks 61 which contact therewith, thus permitting the further movement of the scored and broken blanks longitudinally of the guideways 3 and 4.

Immediately after the stop arms 51 are raised, the feed rollers 62, one associated with each runway and beneath one of which the end of each blank or sheet projects, are operated in the direction of the arrows Fig. 17.

Figure 1:
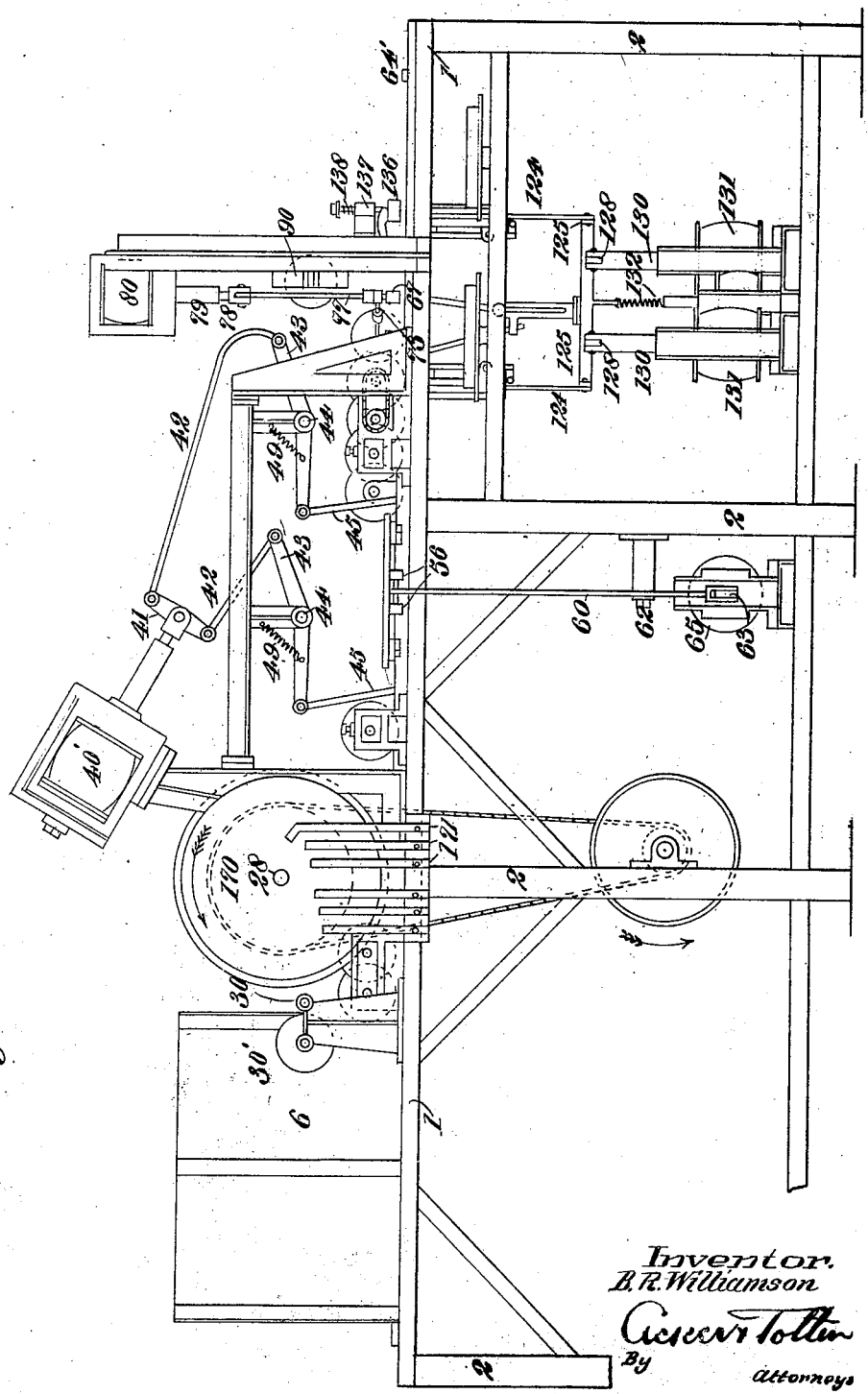
Fig. 1 is a view in side elevation of the general assembly of the preferred embodiment of my invention.

By the rollers 62, the scored and broken blanks are fed to the means for positioning the fastener receiving holes therein, the turntables for disposing corresponding ends in superimposed relation and the means for forming wire fasteners and forcing the same through the superimposed ends, all of which is more particularly illustrated in Figs. 1— and 30 to 48 inclusive of the drawings. The blank or sheet perforating means will be first described. After the blanks pass beneath the rollers 62 they are propelled by the rollers 63' until their ends contact with the respective stops 64' and 65', the stop 64' being of yielding spring construction as in Figs. 30 and 34, and one is associated with each of the guideways 4, the stop 65' being associated with the center guideway 3. Immediately beyond the rollers 63, the side rails 5 of the guideways 3 and 4 terminate— Fig. 30. A frame 64², Figs. 30 and 31, extends upwardly and over the guideways 3 and 4 a short distance beyond the termination of the side rails 5 and the same supports a bar 65² also disposed transversely across the guideways 3 and 4 at a point slightly below the frame 64². Upwardly from the bed of the main frame between the center guideway 3 and the side guideways 4 extend the goose neck frames 66', one overlying each guideway 4. The frames 66' are formed at their ends with a pair of punch guides 67 arranged angularly of the guideways 4 in such manner that they will overlie the end forming sections 68 of the basket side forming blanks or sheets 69 in alignment with the bevel edge 70 thereof. In each guide 67 reciprocates a punch 71, Fig. 32, the punching ends of which are receivable in cutting dies 72 beneath the guides. The punches associated with each frame 66 are connected by a cross bar 73 from which extends a lever 74 fulcrumed to an arm 75. The levers 74 are pivotally connected at a point over the guideway 3, as at 76 Fig. 31, and upwardly from said connection extends a rod 77 pivotally connected through an equalizing cross head 78 with the cores 79 of the electromagnets 80 carried by the frame 64² and energized in the hereinafter described manner. The magnets 80 are energized to operate the punches to perforate the blanks 69 as at 69', immediately after the forward ends of the blanks contact with the stops 64.

The next operation is to move the blanks 69 from their position as in Fig. 34 to that in Fig. 35, and this is accomplished by the mechanism particularly illustrated in Figs. 30, 31 and 36. Mounted for rotation and longitudinal movement within the vertically disposed tubular guides 81 carried by the member 65², at points overlying the blanks 69 adjacent the scored lines at the inner end of their respective portions 68 are the spindles 82, carrying on their lower ends heads 83 mounting blank engaging teeth 84 on their under surface. The spindles on their upper ends carry lateral arms 85 riding on cam surfaces 86 carried by the body of the guides 81, said surfaces being disposed so as to raise and lower the teeth 84 relative to the blanks 69 on the axial rotation of the heads. A link 87 pivotally connects the spindles 82 to cause them to simultaneously rotate in relatively opposite directions. The spindles are operated in unison through a link 88, which connects one end of the core 89 of an electromagnet 90 therewith. A spring 91 restores the spindles to their normal raised position when the magnet 90 is not energized. Immediately after the holes 69' have been punched, the magnet 90 is energized operating the spindles 82 against the action of spring 91 to cause a gradual lowering of the heads 83 into engagement with the blanks 69, to turn or twist the blanks in the direction of the curved arrows Fig. 34. During this twisting or turning movement, the ends of the blanks 69 spring the yieldable stops 64' and travel toward the stop 65', the rear edge of which is beveled as at 92 to facilitate the easy movement of the blank or sheet ends thereover, Figs. 33 and 34, and to prevent the blank ends from striking on their movement on the stop 65' and to insure their uniform superimposition on each other, one end of the stop 65' is in a lower plane as at 93. On the twisting of the blanks 69 from the position in Fig. 34 to that in Fig. 35 the magnet 90 is deenergized and the spring 91 restores the members 83 to normal position.

The overlapping ends of blanks 69 and 81 are next permanently secured together as in Fig. 35, and the mechanism for accomplishing this result is constructed in the following manner, see Figs. 30, 37, 38 and 40 to 48 inclusive and Fig. 50 of the drawings.

The floor of guideway 3 adjacent to the vertically disposed wall 94 of stop 65' is provided with a pair of apertures 95 with each of which connects a guide 96 depending from the under side of the floor and carried by a supporting plate 97, Figs. 40 to 43 of the drawings. Mounted to reciprocate in each guide is a staple forming die 98 having a bifurcated upper end including the pair of prongs 99 having grooved upper ends and opposing inner faces 100. Associated with each die 98 within the respective guides is a reciprocating operating member 101 carrying lugs 102, which in turn support springs 103 coacting with the lower ends of dies 98, and which permit a relative movement of the dies on the members 101. At the base of the slot 104 forming the prongs 99 the die is provided with an aperture 105 adapted to register with a corresponding aperture 106 in an operating member 101. An interlocking plunger 107, Figs. 42 and 47, is mounted to reciprocate in said apertures 105 and 106. The plunger has a central guide and supporting portion 107' of a diameter to freely reciprocate in the apertures 105 and 106, and of a thickness to project a short distance into each aperture when straddling the same and cause a simultaneous movement of members 98 and 101 under certain conditions. The opposite ends of said interlocking plunger are oppositely beveled as at 108 and 109 and project during the reciprocation of the parts 98 and 101 into the respective cam grooves 110 and 111 formed on the opposite inner faces of the plates 97 and 112. A horizontally reciprocating mandrel 113, substantially rectangular in end elevation, operates through an opening in the plate 97 and is adapted to project into the slot 104 and afford a member about which the wire from which the staple is formed is bent. The mandrel 113 is carried by the long end of a lever 114 pivoted as at 115 to a lug carried by the plate 97. The lower end of the lever mounts a roller 115' co-operating with the cam track 116 in the rear face of the member 101, Figs. 42 and 43, and a spring 117 normally maintains the roller 115' in engagement with the cam track. The wire 118 from which the staples are formed is fed into the respective guides 96 through an aperture 119 in the guide side wall, Fig. 44, at a point beneath a cutting jaw 119' and over the prongs 99 at such time as the same are in their lowered position and lie below the mandrel 113. The wire coiled as at 120', Fig. 37, is fed from the coil between grooved feed rollers 120 and 121, Fig. 41, the roller 121 being spring pressed as at 122 toward the roller 120. The roller 120 has associated therewith a ratchet wheel 123, with which coacts a pawl 124 pivotally carried by a cross head frame 125 connecting the lower ends of members 101. A spring 126 maintains the pawl in engagement with its ratchet wheel. The cross head frame connects at 127, Fig. 49, with the outer ends of levers 128 fulcrumed at 129, and the opposite ends of the levers are pivotally connected with the cores 130 of elevating electromagnets 131 simultaneously energized in a hereinafter described manner. From the point 127, a coiled spring 132 depends, the same coacting with the core 133 of a frame lowering electromagnet 134 operated immediately after the magnets 131 are deenergized.

The wire 118 being initially fed through apertures 119 to a position as in Fig. 44 the energizing of the magnets 131 causes the following operation:—The pawl 124 moving upwardly rotates the feed rolls 120 through part 121, the length of wire causing the operation of member 122 and looping exteriorly of the aperture 119 until such time as the inner end of the aperture is unobstructed. Simultaneously with this operation, the member 101 is raised in its guide, the interlock 107 causes the members 99 to move therewith, cutting off the section A of wire within the guide and during their continued upward movement bending the same into staple formation about the mandrel 113. As this bending operation is completed, the mandrel through the passage of wheel 115' down the incline 116' of cam guide 116 is withdrawn from between the members 99. Simultaneously with this latter operation, the interlock 107 is moved in the apertures 105 and 106 by the curvature of grooves 110 and 111 to release the interlocked relation between members 98 and 101, which permits upward movement of the member 98 until the ends of members 99 contact with the underside of the sheets or blanks overlying apertures 95. Springs 103 now yield and permit of free movement of member 98 on member 101. The continued upward movement of member 101 elevates the driving anvil 135 carried by the member 101 between the members 99 which now serve as guides for the formed staple. The driving anvil 135 drives the formed staple upwardly between members 99 and through the material into contact with the clinching anvil 136, Figs. 40, 43 and 50. The clinching anvil is normally held raised in a guide bracket 137 by springs 138, and its depression to clamp the superimposed sheets to the bed takes place immediately after the forming of the staples, it being accomplished through the action of lever 139 fulcrumed to bracket 137 and connected through a link 140 with the slotted arm 141 carried by frame 125, Fig. 50 of the drawings. During the securing of the superimposed ends of the blanks together, a mechanism similar in every respect to the staple material holding, feeding, cutting and forming mechanism positioned beneath the center guideway and illustrated in Fig. 50, is acting on flexible metallic strip material of ribbon form 142 to form therefrom suitable U-shaped metallic fasteners 143 having double points 144 which are projected through the opposite end of the blank 81 from that secured to blanks 69. The mechanism B is operated through the member 145 connected with frame 125. With this mechanism B the clinching anvil 136 differs from that in the stapling mechanism, in that a fixed guide bar 146 is disposed above the apertures 147 and is formed with the converging clinching plunger receiving openings 148, in each of which is mounted to reciprocate a plunger 149, the lower ends of which are cut parallel with the surface of the blank 81. These plungers 149 are simultaneously depressed to engage opposite exterior faces of prongs 144, Fig. 54, and to fold the bases thereof around a section of the blank, bringing the free ends into contact as in Fig. 55 by the following mechanism:—

An actuating bar 150 reciprocating on guides 151 and normally elevated by springs 152 has operating connection with each plunger 149 between the pins 153 extending outwardly from the plunger faces. A lever 154 depresses the bar and from the same depends a pivoted bar 155 extending through a guide opening in a lug 156 on the arm 141. A collar 157 adjustable on the bar 155 is adapted to be engaged by the lug 156 and operate the lever 154 to depress the bar 150. The depressing of this bar 150 will cause converging of the plungers 149 and form from this U-shaped staple extending through the end of blank 81 a fastener adapted when the basket is folded to project through one of the openings 69' and on being expanded to retain the basket in its folded position.

The stop 65' is illustrated as being held within an opening 159 in the center guideway and depending from the same are the supporting studs 160 operating through apertures in a frame 161 below the center guideway. Springs 162 normally maintain the stop 65' in its elevated position. A latch bar 163 depends from the underside of the stop 65' and is adapted to be engaged on the completion of the upward movement of the frame 125 by a latch 164 pivoted to a bracket 165 associated with one of the members 101. A push spring 166 interposed between the lower end of the latch and the edge of the frame 125 normally forces the latching end of the latch toward the bar 163, but a guide stop 167 contacting with the inner edge of the latch as in Fig. 50, prevents the engagement of the latch with the latch bar until such time as the latch has been raised sufficiently to permit the pin to be received in the cut-out 168. At such time as the latch engages the latch bar 163, the stapling and fastener forming operations have been completed, and on the energizing of magnet 134, the engagement of the forming anvil and the members 149 with the basket blank are released and the stop 65' is depressed, after which the rollers 63 are rotated and the staple basket forming blank is discharged from the discharge end of the apparatus.

Referring to Fig. 57, the shaft 28 which is continuously operated carries on its end a contact disk 170, the face of which is provided with metallic contact segments hereinafter described. Co-operating with the face of this disk 170 are a plurality of spring contact fingers 171 arranged in pairs on insulated bases 172 as in Fig. 60 of the drawings and from each of these extends a pair of wires one to the respective electromagnets and the other to a battery as indicated in Fig. 57. These contacts 171 as in Fig. 57 are six in number, being designated respectively by the letters E, F, G, H, I and J and with the respective contact members are adapted to co-operate the respective contact plates E', F', G', H', I' and J' carried on the face of the disk 170. One complete rotation of the disk 170 will cause one operation of each of the electromagnets in the following order. First, the electromagnets 65 controlling the operation of the scoring frame; next, the magnet 40' controlling the breaking mechanism; third, the magnets 80 controlling the mechanism for punching the apertures 69'; fourth, the magnet 90 operating the turntable; fifth, the magnets 131 employed to raise the frame 125: and lastly, the magnet 134 employed to lower the frame 125 and permit the discharge of the completed basket forming blank from the apparatus. It will be observed that during the different operations such as scoring, breaking, punching, and fastening of the respective blanks, that the blanks during each operation are arrested in their movement by suitable stops and that on the completion of the operation the stops are removed permitting the continuously rotating conveyor rollers to carry the blanks along the respective guideways.

Having thus described my invention, what I claim as new and desire to protect by Letters Patent of the United States is:—

1. An apparatus for assembling side and bottom forming blanks in flat formation to provide a flat unit from which a basket is adapted to be subsequently folded, the same including means for scoring the blanks transversely to provide fold lines, and means for breaking the blanks on their scores.

2. An apparatus for assembling side and bottom forming blanks in flat formation to provide a unit from which a basket is adapted to be subsequently folded, the same including means for scoring the blanks transversely to provide fold lines, and means for securing the blanks together at one end.

3. An apparatus for assembling side and bottom forming blanks in flat formation to provide a unit from which a basket is adapted to be subsequently folded, the same including means for scoring the blanks transversely to provide fold lines, and means for positioning the ends of the blanks in overlapping relation, and means for permanently securing the overlapping ends of the blanks together.

4. An apparatus for assembling side and bottom forming blanks in flat formation to provide a unit from which a basket is adapted to be subsequently folded, the same including means for scoring the blanks transversely to provide fold lines, means for breaking the blanks on their scores, and means for securing the blanks together at one end.

5. An apparatus for assembling side and bottom forming blanks in flat formation to provide a unit from which a basket is adapted to be subsequently folded, the same including means for scoring the blanks transversely to provide fold lines, means for breaking the blanks on the scores, means for moving the blanks to position corresponding ends in overlapping relation, and means for permanently securing overlapping ends together.

6. An apparatus for assembling side and bottom forming blanks in flat formation to provide a unit from which a basket is adapted to be subsequently folded, the same including means for scoring the blanks transversely to provide fold lines, means for breaking the blanks on the scores, means for moving the blanks to position corresponding ends in overlapping relation, and means for forming a staple and for passing the same through the overlapping blank ends to secure the same together.

7. An apparatus for assembling side and bottom forming blanks in flat formation to provide a unit from which a basket is adapted to be subsequently folded, the same including means for scoring the blanks transversely to provide fold lines, means for breaking the blanks on the scores, means for moving the blanks to position corresponding ends in overlapping relation, means for forming a staple and for passing the same through the overlapping blank ends to secure the same together, and means for clinching the staple ends.

8. An apparatus for assembling side and bottom forming blanks in flat formation to provide a unit from which a basket is adapted to be subsequently folded, the same including means for scoring the blanks transversely to provide fold lines, means for breaking the blanks on the fold lines, means for positioning the ends of the side forming blanks to overlie one end of the bottom forming blank, and means for forcing retaining means through the overlapping portions of said blanks for securing the same together in their relative angular position.

9. An apparatus for assembling side and bottom forming blanks in flat formation to provide a unit from which a basket is adapted to be subsequently folded, the same including a blank scoring mechanism, means for feeding the blanks thereto in parallel relation, means for operating the scoring mechanism to score the blanks transversely to provide fold lines, means for twisting the outer blanks to position corresponding ends in overlapping relation relatively to one end of the bottom forming blank, and means for uniting the overlapping ends to maintain said blanks in their relative angular relation.

10. An apparatus for assembling side and bottom forming blanks in flat formation to provide a unit from which a basket is adapted to be subsequently folded, the same including a blank scoring mechanism, means for feeding the blanks thereto in parallel relation, means for operating the scoring mechanism to score the blanks transversely to provide fold lines, means for twisting the outer blanks to position corresponding ends in overlapping relation relatively to one end of the bottom forming blank, and means for perforating the opposite ends of the blanks to enable the same to be secured together on the folding of the blanks into box formation.

11. An apparatus for assembling side and bottom forming blanks in flat formation to provide a unit from which a basket is adapted to be subsequently folded, the same including a blank scoring mechanism, means for feeding the blanks thereto in parallel relation, means for operating the scoring mechanism to score the blanks transversely to provide fold lines, means for twisting the outer blanks to position corresponding ends in overlapping relation relatively to one end of the bottom forming blank, means for perforating the opposite ends of the blanks to enable the same to be secured together on the folding of the blanks into box formation, and means for positioning a digitally operated fastening device within one of said perforations to enable the securing of the free ends of the sections together when the blank is folded into basket formation.

12. An apparatus for assembling side and bottom forming blanks in permanent formation to provide a unit from which a basket is adapted to be subsequently folded, the same including means for receiving bottom and side forming blanks in parallel relation, means for scoring the blanks transversely to provide fold lines, means for breaking the blanks on the fold lines, means for twisting the side forming blanks to position the same in angular relation relative to the bottom forming blank with one end of each side forming blank overlapping one end of the bottom forming blank, and means for uniting the overlapping ends of the blanks at a plurality of points to maintain the blanks in their relative angular relation.

13. An apparatus for assembling side and bottom forming blanks in permanent relation to provide a unit from which a container is adapted to be subsequently folded, the same including three substantially aligned magazines, a center magazine containing the bottom forming blanks and the end magazines containing the side forming blanks, means for simultaneously removing the lowermost blank from said magazines and for conveying the same therefrom in parallel relation, a plurality of knives movable across the path of movement of the blanks and adapted to score said blanks transversely to provide fold lines, means for bending the ends of the blanks toward the uncut side thereof to break the blanks on their crease lines, means for twisting the end blanks to position one of each in overlapping relation relative to one end of the bottom forming blank and with the side forming blanks extending angularly, one forming each side of the bottom forming blank, and means for securing the overlapping ends together.

14. An apparatus for assembling side and bottom forming blanks in flat formation to provide a unit from which a basket is adapted to be subsequently folded, including means for scoring the blanks transversely to provide fold lines, means for breaking the blanks on their scores, and means for securing the blanks together at one end with the side forming blanks extending angularly from the opposite sides of one end of the bottom forming blank.

In testimony whereof I have signed my name to this specification.

BARTLETT R. WILLIAMSON.